Patented Aug. 22, 1950

2,519,833

UNITED STATES PATENT OFFICE 2,519,833

MILK CHOCOLATE

Bror Knut Hällqvist, Stockholm, and Liss Olof Jan Campbell, Norrkoping, Sweden, assignors to Svenska Mjolkprodukter Aktiebolag, Stockholm, Sweden, a corporation of Sweden No Drawing. Application October 15, 1946, Serial No. 703,273. In Sweden February 23, 1945

6 Claims. (Cl. 99—24)

In the manufacture of chocolate in the form of blocks and the like it is known to use milk powder, and more particularly a roller-dried milk powder is normally utilized for the purpose. Spray-dried milk powder gives the chocolate a better and purer flavour but has not been employed to any large extent by reason of the fact that the commercial spray-dried powder available requires more fat to be capable of being rolled before the conching operation. If more fat is not added, the mass will be found to be too dry to be rolled and will fall to crumbs. However, if more fat is added the flavour will be found to be better immediately after the manufacture, than if roller-dried milk powder, had been utilized, but the flavour will change more rapidly and the quality will soon be impaired due to the higher fat content.

A closer examination of this condition has shown that the reason of the high requirement of fat is that commercial spray-dried powder consists of porous grains which absorb the fat in their pores, which causes a certain fat quantity, normally about 20 percent of the milk powder quantity, to be kept away from the mixture, so that it is disabled to serve its purpose as a binder. However, if milk powder is produced in a spray drying plant in a manner to have it free or substantially free from air cells, or pores, it will be found that the above-mentioned addition of extra fat is not necessary, and that a chocolate is obtained which possesses the fine flavour characteristic of chocolate produced with spray-dried milk powder, and furthermore the great keeping qualities characteristic of chocolate made with roller-dried milk powder.

It has been found that the spray-dried powder need not be absolutely free from air cells to result in more advantageous conditions that those obtained previously. Already with a porosity corresponding to an air content of 10 per cent by volume in the spray-dried powder the said extra fat consumption is reduced to such a degree that the substantial disadvantages from the point of view of keeping quality are eliminated. With 8 per cent air by volume in the powder the difference in quality of the chocolate produced with spray-dried powder and that produced with roller-dried powder is scarcely perceptible, and no difference whatever is observable when the air content in the spray-dried powder is 5 per cent by volume, or less. The spray-dried powder containing little or no air can be produced, for instance, according to the method disclosed in the U. S. application Serial No. 703,272, filed October 15, 1946.

Example

In producing milk chocolate containing 11.25% cocoa, 28.50% milk powder, 46.75% sugar and 13.50% cocoa butter and using therefor in different cases roller-dried milk powder, ordinary spray-dried milk powder and a spray-dried milk powder containing 5.5% air, it will be found that the rolling operation will proceed in the same way when either a roller-dried milk powder or a spray-dried milk powder containing 5.5% air is employed, whereas the rolling operation will become considerably more difficult or even impossible if an ordinary spray-dried powder is utilized. The said difficulty or impossibility is dependent on the fat content of the cocoa. As a result, from a roller-dried powder and from a spray-dried powder containing 5.5% air, chocolate blocks are obtained which are equivalent from the storage point of view, though the latter being superior to the former as to their flavour.

What we claim is:

1. The method of producing milk chocolate by mixing cocoa, fat, sugar and spray-dried milk which comprises utilizing as the lacteal component of the mix a spray-dried milk powder having an average grain porosity not exceeding approximately 10 per cent by volume.

2. The method of producing milk chocolate by mixing cocoa, fat, sugar and spray-dried milk which comprises utilizing as the lacteal component of the mix a spray-dried milk powder having an average grain porosity not exceeding approximately 8 per cent by volume.

3. The method of producing milk chocolate by mixing cocoa, fat, sugar, and spray-dried milk which comprises utilizing as the lacteal component of the mix a spray-dried milk powder having an average grain porosity not exceeding approximately 5 per cent by volume.

4. A chocolate mass comprising a mixture of cocoa, fat, sugar and a spray-dried milk powder having an average grain porosity not exceeding 10 per cent by volume.

5. A chocolate mass comprising a mixture of cocoa, fat, sugar and a spray-dried milk powder having an average grain porosity not exceeding 8 per cent by volume.

6. A chocolate mass comprising a mixture of cocoa, fat, sugar and a spray-dried milk powder having an average grain porosity not exceeding 5 per cent by volume.

BROR KNUT HÄLLQVIST.
LISS OLOF JAN CAMPBELL.

REFERENCES CITED

The following references are of record in the file of this patent:

UNITED STATES PATENTS

| Number | Name | Date |
|---|---|---|
| 1,219,286 | Gere | Mar. 13, 1917 |
| 1,432,635 | Stevens | Oct. 17, 1922 |
| 1,762,026 | Nyrop | June 3, 1930 |
| 1,882,028 | Otting | Oct. 11, 1932 |
| 2,016,592 | Chuck | Oct. 8, 1935 |
| 2,088,606 | Peebles et al. | Aug. 3, 1937 |
| 2,136,651 | Fear | Nov. 15, 1938 |
| 2,188,506 | Hall | Jan. 30, 1940 |